United States Patent
Babinski

(10) Patent No.: US 8,950,282 B2
(45) Date of Patent: Feb. 10, 2015

(54) BALL SCREW ASSEMBLY WITH ENHANCED RADIAL LOAD CAPACITY AND METHOD OF CONSTRUCTION THEREOF

(75) Inventor: James A. Babinski, Saginaw, MI (US)

(73) Assignee: Meggitt-USA, Inc., Simi Valley, CA (US)

( * ) Notice: Subject to any disclaimer, the term of this patent is extended or adjusted under 35 U.S.C. 154(b) by 364 days.

(21) Appl. No.: 13/362,303

(22) Filed: Jan. 31, 2012

(65) Prior Publication Data

US 2012/0192663 A1  Aug. 2, 2012

Related U.S. Application Data

(60) Provisional application No. 61/437,780, filed on Jan. 31, 2011.

(51) Int. Cl.
*F16H 25/22* (2006.01)
*B23P 15/00* (2006.01)

(52) U.S. Cl.
CPC ........ *F16H 25/2214* (2013.01); *F16H 25/2204* (2013.01); *B23P 15/00* (2013.01)
USPC ..................................... 74/424.84; 74/424.82

(58) Field of Classification Search
CPC .................................................. F16H 25/2204
USPC ............................. 74/424.75, 424.82, 424.84
See application file for complete search history.

(56) References Cited

U.S. PATENT DOCUMENTS

| | | | | | |
|---|---|---|---|---|---|
| 2,455,368 | A | * | 12/1948 | Hoffar | 74/424.86 |
| 4,074,587 | A | * | 2/1978 | Brusasco | 74/424.82 |
| 5,467,662 | A | * | 11/1995 | Lange et al. | 74/424.83 |
| 6,453,761 | B1 | | 9/2002 | Babinski | |

* cited by examiner

*Primary Examiner* — David M Fenstermacher
*Assistant Examiner* — Terence Boes
(74) *Attorney, Agent, or Firm* — John D. Wright; Dickinson Wright PLLC

(57) ABSTRACT

A linear ball screw assembly and method of construction thereof is provided. The assembly includes a screw having a helical external groove and a ball nut having a through bore configured for receipt of the screw therethrough and including a helical internal groove radially aligned with the external groove of the screw to form a helical raceway. A plurality of axial load balls are disposed in the helical raceway. The nut includes a pair of non-grooved internal cylindrical surfaces extending in axially opposite directions from the internal groove along the external groove of the screw to provide outer surfaces of a pair of radial load raceways. A plurality of radial load balls are disposed in the radial load raceways. The radial and axial load balls have different diameters and/or the internal cylindrical surfaces are provided by a pair of sleeve inserts.

16 Claims, 4 Drawing Sheets

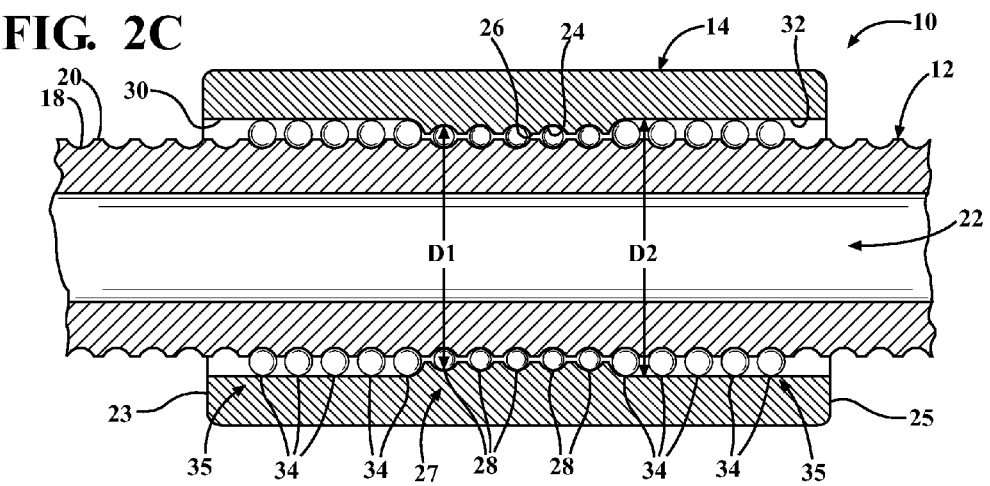
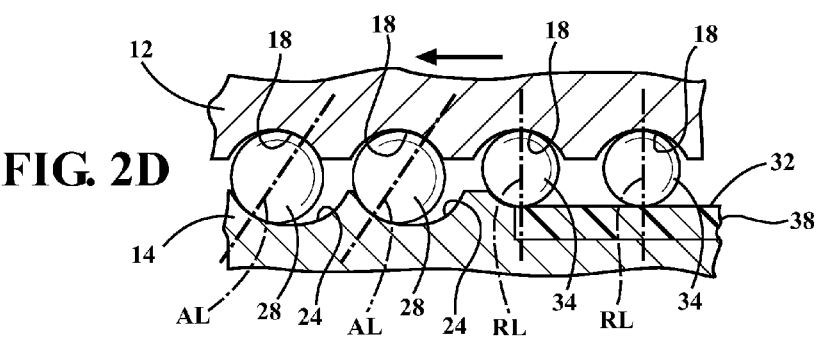
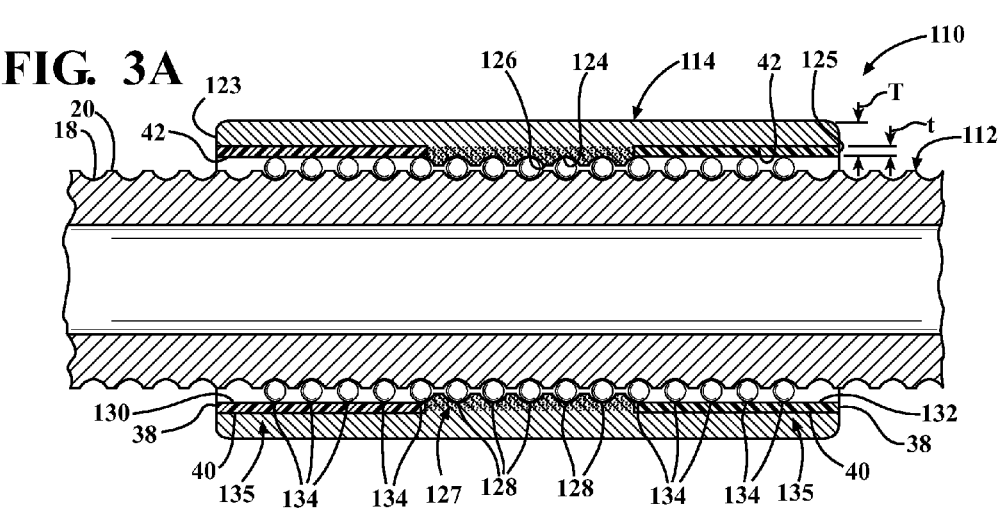

BALL SCREW ASSEMBLY WITH ENHANCED RADIAL LOAD CAPACITY AND METHOD OF CONSTRUCTION THEREOF

CROSS-REFERENCE TO RELATED APPLICATION

This application claims the benefit of U.S. Provisional Application Ser. No. 61/437,780, filed Jan. 31, 2011, which is incorporated herein by reference in its entirety.

BACKGROUND OF THE INVENTION

1. Technical Field

This invention relates generally to linear motion assemblies, and more particularly to ball screw assemblies.

2. Related Art

Ball screw assemblies are well known for use to effect linear actuation in various industries, such as machine tool, automotive, aircraft and aerospace, for example. Typically, a commercial ball screw assembly includes a screw with a continuous external helical ball groove and a ball nut with a continuous internal helical ball groove, with the external and internal ball grooves being configured with substantially identical uninterrupted leads to provide a single, continuous ball track. With the ball nut received on the ball screw and with the ball grooves arranged opposite one another, a plurality of balls are disposed in the single, continuous ball track between the opposed, continuously cooperating helical grooves. Typically, one or more ball return mechanisms are incorporated in the ball nut to re-circulate the balls over 1 or more turns of the ball track, wherein a single turn represents a 360 degree traversal about the circumference of the ball track. As the balls are re-circulated through their respective ball track, side surfaces of the mating helical grooves contact the balls under a compression load to counteract axial loads along a centerline of the assembly. Thus, while being well adapted to accommodate axial loading, the typical ball screw assembly is not well suited to support a radial load, also referred to as side loading or moment loading, in combination with an axial load imparted on the ball nut. As such, side loads typically have a deleterious effect on the load carrying capacity and useful life of the ball screw assembly.

SUMMARY OF THE INVENTION

A linear ball screw assembly includes a screw having a helical external groove extending continuously over a plurality of turns with a radially outwardly extending, continuous helical land formed between adjacent turns and a ball nut having a through bore extending between opposite ends. The through bore of the ball nut is configured for receipt of the screw therethrough and includes a helical internal groove extending over a plurality of turns with a radially inwardly extending helical land formed between adjacent turns. The internal groove of the ball nut is located generally centrally between the opposite ends and is radially aligned with the external groove of the screw to form a helical raceway. A plurality of axial load balls are disposed in the helical raceway. The nut includes a plurality of internal cylindrical surfaces extending in axially opposite directions from the internal groove. The internal cylindrical surfaces extend a predetermined length axially along the external groove of the screw to provide outer surfaces of a plurality of radial load raceways. A plurality of radial load balls are disposed in the radial load raceways. The radial load balls and the axial load balls, in accordance with one aspect of the invention, have different diameters to provide the precise axial and radial load carrying capacity desired.

In accordance with another aspect of the invention, the cylindrical surfaces of the nut are provided by a piece of material separate from the material of the nut.

In accordance with another aspect of the invention, the cylindrical surface are provided by sleeve inserts separate from the nut, wherein the material of the sleeve inserts has an increased hardenability relative to the material of the nut.

In accordance with another aspect of the invention, a linear ball screw assembly includes a screw having a helical external groove extending continuously over a plurality of turns with a radially outwardly extending, continuous helical land formed between adjacent turns. The assembly further includes a ball nut having a through bore extending between opposite ends, wherein the through bore is configured for receipt of the screw therethrough. The ball nut includes a helical internal groove extending over a plurality of turns with a radially inwardly extending helical land formed between adjacent turns. The internal groove is located generally centrally between the opposite ends and is radially aligned with the external groove of the screw to form a helical raceway. A plurality of axial load balls are disposed in the helical raceway. The ball nut includes a plurality of internal cylindrical surfaces. The internal cylindrical surfaces extend in axially opposite directions from the internal groove. The internal cylindrical surfaces extend a predetermined length axially along the external groove of the screw to provide outer surfaces of a plurality of radial load raceways. A plurality of radial load balls are disposed in the radial load raceways. The internal cylindrical surfaces are provided by a plurality of sleeve inserts, thereby allowing the sleeve inserts to be provided from the material best suited for the intended application without having to make the ball nut from the same material.

In accordance with another aspect of the invention, a method of constructing a linear ball screw assembly is provided. The method includes providing a screw having a helical external groove extending continuously over a plurality of turns with a radially outwardly extending, continuous helical land formed between adjacent turns; providing a ball nut having a through bore extending between opposite ends with a helical internal groove extending over a plurality of turns between the opposite ends with a plurality of cylindrical bores extending in axially opposite directions from the helical internal groove toward the opposite ends; disposing a plurality of sleeve inserts having internal cylindrical surfaces in the cylindrical bores of the ball nut; disposing the screw through the through bore of the ball nut and forming a helical raceway between the helical internal groove of the ball nut and the helical external groove of the screw and a plurality of radial load raceways between the internal cylindrical surfaces of the sleeve inserts and the helical external groove of the screw; and disposing a plurality of balls in the helical raceway and the radial load raceways.

A linear ball screw assembly constructed in accordance with the invention, among other objects, features and advantages which will become readily apparent to those skilled in the art, provides a mechanism for increasing the radial load carrying capacity of a ball screw assembly, is economical in manufacture, and has a long and useful life.

BRIEF DESCRIPTION OF THE DRAWINGS

These and some other objects, features and advantages will become readily apparent in view of the following detailed description of the presently preferred embodiments and best mode, appended claims, and accompanying drawings, in which:

FIG. 2C is a cross-sectional view similar to FIG. 2A of a ball screw assembly constructed in accordance with another aspect of the invention;

FIG. 2D is an enlarged cross-sectional view showing a portion of an axial load raceway and radial load raceway constructed in accordance with one aspect of the invention illustrating the different load directions of the raceways;

FIG. 3A is a cross-sectional view of a ball screw assembly constructed in accordance with another aspect of the invention;

DETAILED DESCRIPTION OF PRESENTLY PREFERRED EMBODIMENTS

Figure 1:
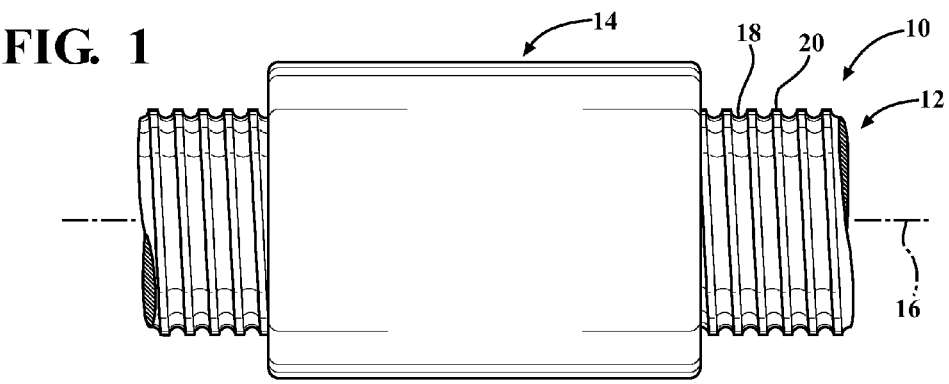
FIG. 1 is a side view of a ball screw assembly constructed in accordance with one presently preferred aspect of the invention.
Figure 2A:
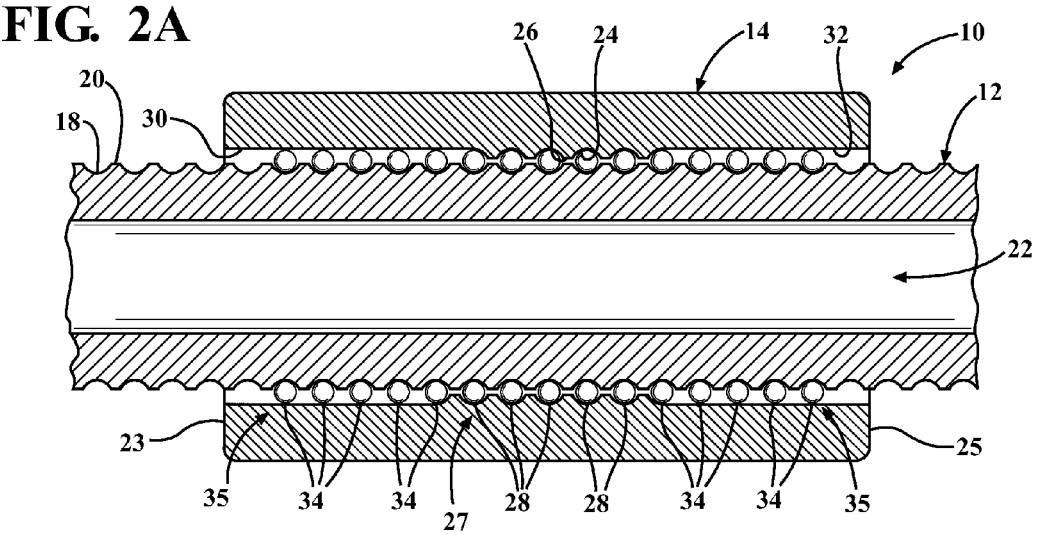
FIG. 2A is a cross-sectional view taken generally along the line 2-2 of FIG. 1.

Referring now in more detail to the drawings, FIG. 1 illustrates a linear ball screw assembly, referred to hereafter as assembly 10, constructed in accordance with one aspect of the invention, shown without regard to any specific type of ball return mechanism, which is discussed further below. The assembly 10 includes an externally threaded shaft, also referred to as screw, generally designated 12, assembled coaxially with a ball nut, generally designated 14, along a longitudinal central axis 16. The screw 12 has a helical external groove 18 extending continuously over a plurality of turns along its length with a radially outwardly extending, continuous helical land 20 formed between adjacent turns. As shown in FIG. 2A, the ball nut 14 has a through bore 22 extending between opposite ends 23, 25 of the ball nut 14, wherein the through bore 22 is configured for receipt of the screw 12 therethrough. The through bore 22 includes a helical internal groove 24 extending over a plurality of turns with a radially inwardly extending helical land 26 formed between adjacent turns. The internal groove 24 is located generally centrally between the ends 23, 25, with the internal groove 24 being radially aligned with the external groove 18 of the screw 12 to form a helical axial load raceway 27 in which a plurality of axial load balls 28 are received. Further, the ball nut 14 has a plurality of internal cylindrical surfaces 30, 32, shown as a pair, by way of example, extending in axially opposite directions from the internal groove 24 toward the opposite ends 23, 25. The cylindrical surfaces 30, 32 extend a predetermined length axially about the external groove 18 of the screw 12 to provide outer surfaces of a plurality of radial load raceways 35 configured for receipt of radial load balls 34. The cylindrical surfaces 30, 32 can be selectively sized in diameter during manufacture, thereby allowing the radial load balls 34 to be provided having the same diameter, smaller diameter or larger diameter relative to the axial load balls 28. Accordingly, the radial and axial load carrying capacity of the ball nut 14 can be precisely controlled during manufacture, thereby allowing the assembly 10 to be constructed having the desired axial and radial load carrying capacity.

The screw 12, as indicated above, is provided with the continuous helical groove 18. The concave geometry of the groove 18 can be configured as desired to provide the desired contact patch between the axial load balls 28 and the groove 18 (FIG. 2D, showing condition where screw 12 is biased relative to the nut 14 along the direction of the arrow), wherein the groove 18 can have a slightly increased radius of curvature relative to the axial load balls 28, or it can be formed having a "Gothic arch" configuration, or otherwise. Regardless of the type of concavity, the axial contact load line L extends oblique to the central axis 16, with the direction of the load line shifting depending on the direction of the axial load, as is known by those skilled in the art.

Figure 2B:
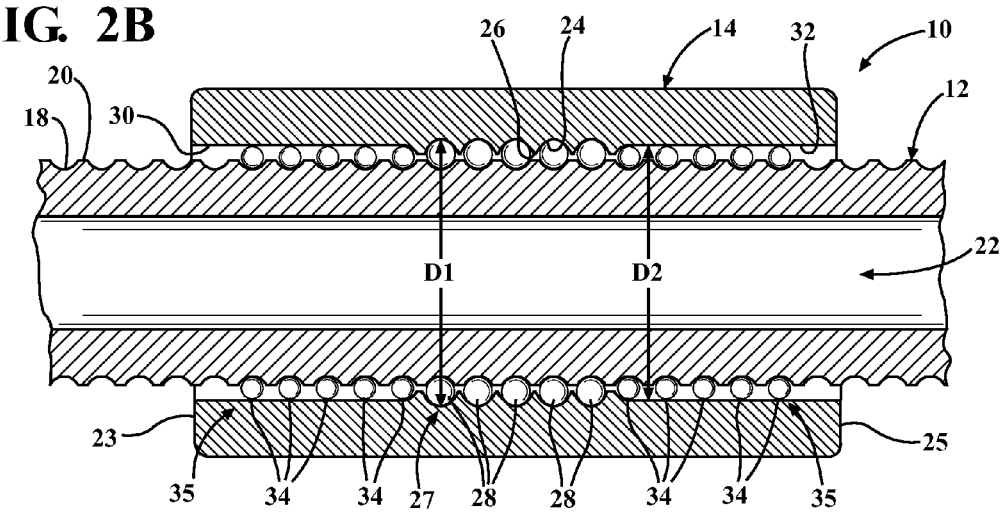
FIG. 2B is a cross-sectional view similar to FIG. 2A of a ball screw assembly constructed in accordance with another aspect of the invention.

The cylindrical surfaces 30, 32, as shown in FIGS. 2A-2C, can be formed in the material of the ball nut 14 using any suitable machining operation to provide the desired ball running surface finish. Further, the cylindrical running surfaces 30, 32 are preferably hardened, wherein the hardness is generally about 56 Rc if formed in the material of the ball nut, which can be formed of a low carbon steel, for example. As mentioned above, the cylindrical running surfaces 30, 32 can be formed having the desired running diameter to allow the radial load balls 34 to be precisely selected to optimized the radial load carrying capacity desired for the intended application. For example, as shown in FIG. 2A, the running surfaces 30, 32 can be sized to allow the axial load balls 28 and the radial load balls 34 to be selected having the same diameter. Otherwise, as shown in FIGS. 2B and 2C, the running surfaces 30, 32 can be sized to allow the axial load balls 28 and the radial load balls 34 to be selected having different diameters. In particular, FIG. 2B illustrates a scenario where the running surfaces 30, 32 are sized having a slightly smaller outer running diameter than the helical axial load raceway 27, thereby allowing the radial load balls 34 to be selected having a slightly smaller diameter than the axial load balls 28. Accordingly, the internal groove 24 has a root diameter and running surface diameter D1 along which the balls 28 make running contact and the internal cylindrical surfaces 30, 32 have a diameter D2 less than the root and running surface diameters D1. This may be beneficial in applications wherein increasing the radial load carrying capacity of the assembly 10 is important, while at the same time, maximizing the running speed of the assembly 10. On the other hand, FIG. 2C illustrates a scenario where the running surfaces 30, 32 are sized having a slightly larger outer running diameter than the helical axial load raceway 27, thereby allowing the radial load balls 34 to be selected having a slightly larger diameter than the axial load balls 28. Accordingly, the internal groove 24 has a root diameter and running surface diameter D1 along which the balls make running contact and the internal cylindrical surfaces 30, 32 have a diameter D2 greater than the root and running surface diameters D1. Regardless, the radial load balls 34 can be selected to provide a line-to-line or substantially line-to-line fit within the radial load raceways 35 between the cylindrical surfaces 30, 32 and the external groove 18. Accordingly, the radial lash of the nut 14 on the screw 12 can be precisely controlled and minimized, if not zero, with the radial load balls 34 providing radial load support adjacent both ends 23, 25 of the nut 14. Of course, one of ordinary skill in the art will recognize that the radial load balls 34 are loaded over a segment of the circumference along a radial load line RL (FIG. 2D), and unloaded over a remaining segment of the circumference, depending on the direction of the side or moment loading. Further, the radial load balls 34, unlike the axial load balls 28, make contact over a uniform contact patch on both sides of the helical groove 18 of the screw 12 as a result of the cylindrical surfaces 32, as shown in FIG. 2D.

In FIGS. 3A-3D, a ball screw assembly 110 constructed in accordance with another aspect of the invention is shown, wherein the same reference numerals as used above, offset by a factor of 100, are used to identify similar features.

The assembly 110 is similar to the previously discussed assembly 10, having a screw 112, a ball nut 114, with axial load balls 128 configured the same as above to carry axial loading between the screw 112 and the ball nut 114 within a helical axial load raceway 127 and with radial load balls 134 configured the same as above to carry radial loading between the screw 112 and the ball nut 114 within a radial load raceway 135. However, the ball nut 114, rather than having cylindrical surfaces formed in the material of the ball nut 114, has cylindrical surfaces 130, 132 provided by a piece of material separate from the material of the ball nut 114. The material used to provide the cylindrical surfaces 130, 132 can be provided of any material having the desired hardenability, such as low carbon steel or stainless steel, by way of example, and thus, can be provided of a material capable of attaining increased hardness relative to the material used to construct the nut 114 without having to make the entire ball nut 114 from a material that could be costly. For example, the material, as shown, is provided as a pair of cylindrical sleeve inserts, also referred to as inserts or sleeves 38, having outer cylindrical surfaces 40 sized to be fixed in mating cylindrical bores 42 extending into opposite ends 123, 125 of the nut 114, such as via a slight press fit, for example. Any suitable mechanism can be used to fix the sleeves 38 in the bores 42, including welding, mechanical fasteners, e.g. set screws or snap rings, return buttons, or any suitable bonding agent could be used. Further yet, by being able to provide the hardened running surfaces 130, 132 via the sleeve inserts 38, potential hardening issues with regard to the ball nut 114 can avoided. For example, where the ball nut wall thickness (T) extending between the outer surface of the ball nut 114 and the running surfaces 130, 132 is minimal, the concern of over-hardening the entire wall thickness T is avoided, given this region of the ball nut 114 (T−t) is not hardened. Accordingly, the wall thickness (T−t) in this region can retain a relatively soft Rockwell hardness, e.g. less than 40 Rc, thereby allowing this region of the ball nut 114 to retain a high relative strength in comparison to if it were hardened above 40 Rc, which would tend to otherwise make the wall brittle, thereby diminishing the radial load capacity and useful life of the assembly 110.

Figure 3B:
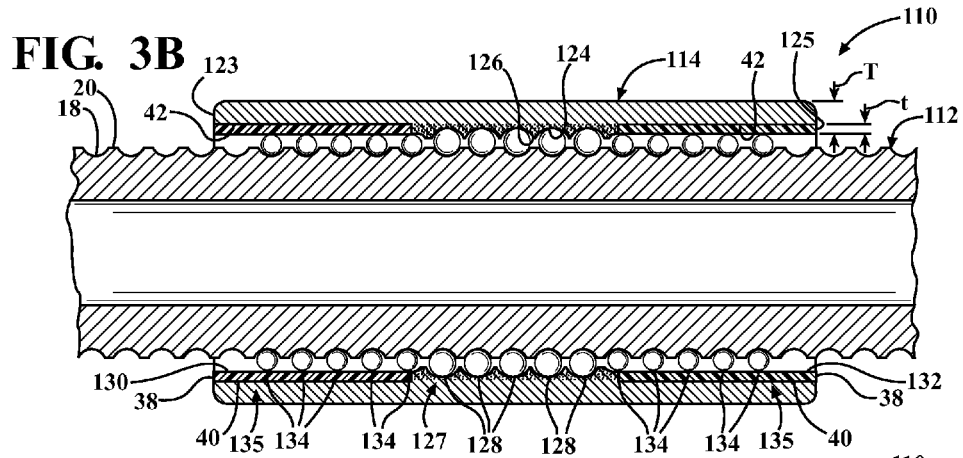
FIG. 3B is a cross-sectional view similar to FIG. 3A of a ball screw assembly constructed in accordance with another aspect of the invention.
Figure 3C:
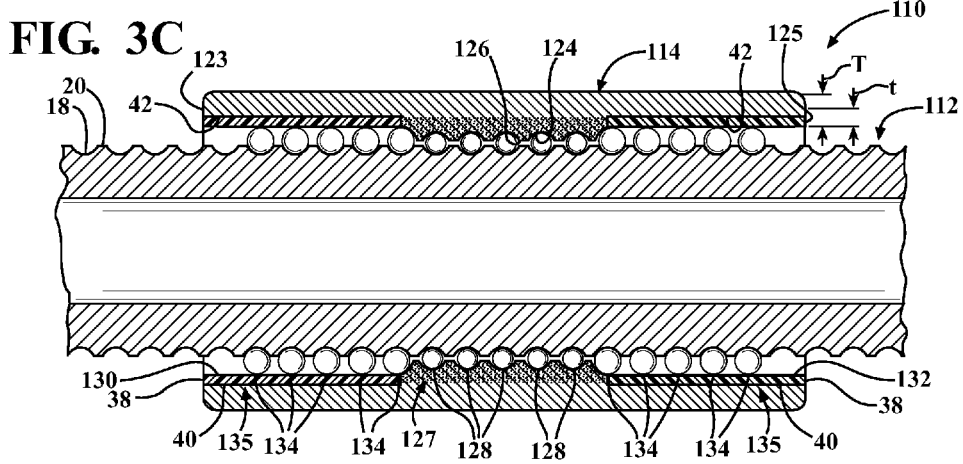
FIG. 3C is a cross-sectional view similar to FIG. 3A of a ball screw assembly constructed in accordance with yet another aspect of the invention.
Figure 3D:
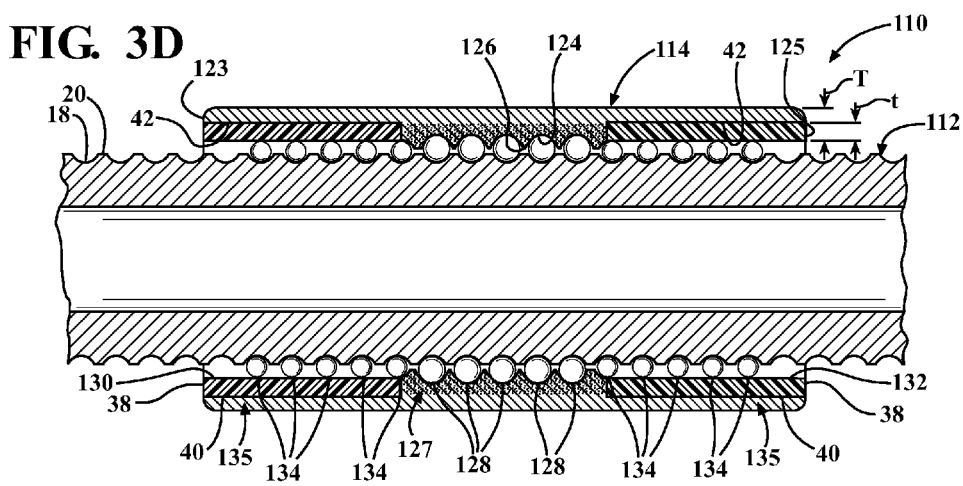
FIG. 3D is a cross-sectional view similar to FIG. 3A of a ball screw assembly constructed in accordance with yet another aspect of the invention.

The sleeve inserts 38 can be machined and hardened to a finished state and then assembled to the nut 114, or the sleeves 38 can be hardened and fixed to the nut 114 and then finish machined to ensure the finished running surface 130, 132 are dimensioned within the desired tolerances, or the sleeves 38 can be both hardened and machined after being installed in the ball nut 114. As such, not only can the sleeves 38 provide the running surfaces 130, 132 against which the radial load balls 134 ride with increased hardness, but they can also provide the running surfaces 130, 132 having tighter tolerances, e.g. roundness and surface finish. Of course, depending on the diameter of radial load balls 134 being used, the sleeves 38 can be machined and ground accordingly. For example, FIG. 3A shows the sleeves 38 being machined and ground to accommodate radial load balls 134 of the same diameter as the axial load balls 128; FIG. 3B shows the sleeves 38 being machined to accommodate radial load balls 134 having a smaller diameter than the axial load balls 128, wherein the internal groove 124 has a root diameter and running surface diameter D1 and the internal cylindrical surfaces 130, 132 have a diameter D2 less than the root and running surface diameters, such as illustrated in FIG. 2B; and FIG. 3C shows the sleeves 38 being machined to accommodate radial load balls 134 having a larger diameter than the axial load balls 128, wherein the internal groove 124 has a root diameter and running surface diameter D1 and the internal cylindrical surfaces 130, 132 have a diameter D2 greater than the root and running surface diameters. In addition, as shown in FIG. 3D, depending on the wall thickness T of the nut 114, the wall thickness (t) of the sleeve 38 can be varied, shown as being increased in thickness relative to the embodiments of FIGS. 3A-3C. It should be recognized that by being able to provide the running surfaces 130, 132 via the sleeves 38, the overall envelope of the ball nut can be minimized given the wall thickness (T−t) of the ball nut material extending about the radial load raceways 135 can be minimized without concern for its strength, since it is not hardened, thereby retaining its unhardened, enhanced strength. Accordingly, the material of the ball nut 114 that is radially aligned with the sleeves 38 and their internal running surfaces 130, 132 is not hardened. This is due to the fact that the material of the sleeves 38 is the hardened material against which the radial load balls 134 ride and not the material of the ball nut 114. Further, given the cylindrical running surfaces 130, 132 surfaces are formed in the separately fabricated inserts 38, the manufacturing tolerances of the bores 42 in the ball nut can be relaxed, as these dimensions are not as critical as the running surfaces 130, 132 provided by the sleeves 38. Accordingly, the manufacture of the ball nut 114 can be made more economical.

Figure 4A:
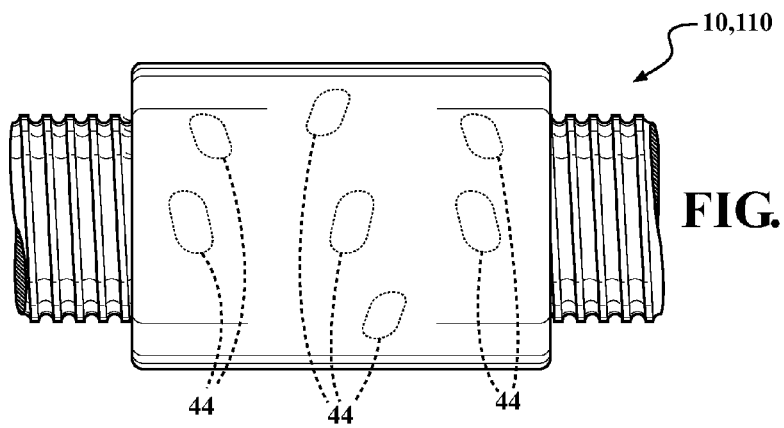
FIGS. 4A-4C illustrate different types of ball return mechanisms for use with the various ball screw assemblies constructed in accordance with the invention.
Figure 4B:
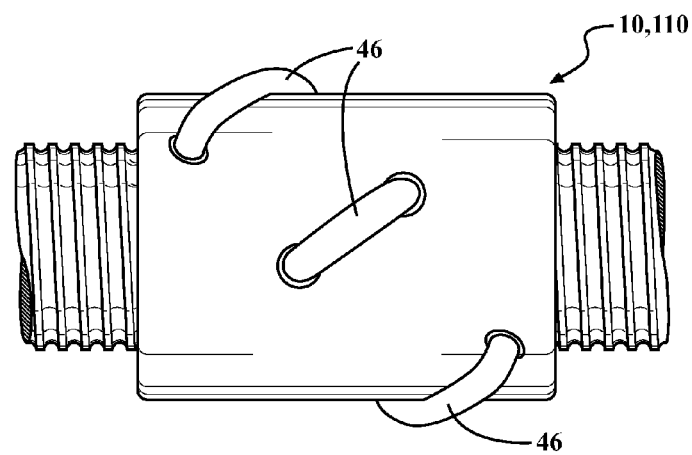
Figure 4C:
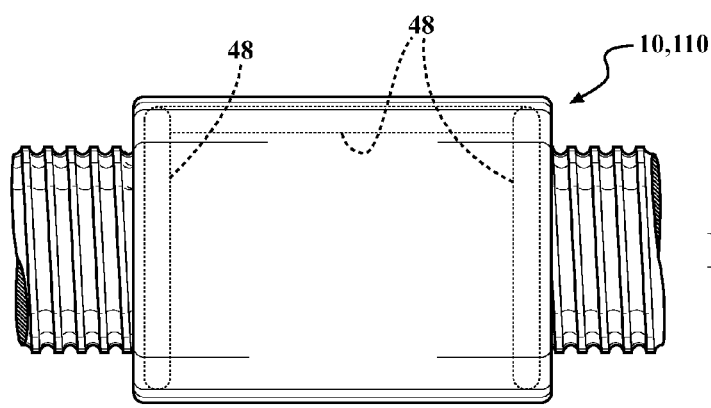

In FIGS. 4A-4C, various return mechanism are shown that can be incorporated in the assemblies 10, 100 discussed above. FIG. 4A illustrates a return button insert mechanism 44, FIG. 4B illustrates an external return tube mechanism 46, and FIG. 4C illustrates an internal end cap return mechanism 48. The end cap return mechanism 48 is particularly useful for embodiments wherein the axial and radial load balls 28, 34, 128, 134 are the same diameter (FIGS. 2A and 3A), given the balls get channeled over the entire length of the assemblies 10, 110, and thus, roll through each of the radial load raceways 35, 135 and also the central axial load raceway 27, 127. As for the return mechanisms 44, 46, one skilled in the art will readily recognized that a plurality of these mechanisms 44, 46 can be used, as desired, depending the number of turns desired for the respective balls 28, 34, 128, 134.

It should be recognized that upon reading the disclosure herein, one ordinarily skilled in the art of ball screw assemblies would readily recognize other embodiments than those expressly discussed herein, with those embodiments being within the spirit and scope of the invention. The scope of the invention is defined by the following claims, and any claims which issue as a result of an application related hereto.

What is claimed is:

1. A linear ball screw assembly, comprising:
   a screw having a helical external groove extending continuously over a plurality of turns with a radially outwardly extending, continuous helical land formed between adjacent turns;
   a ball nut having a through bore extending between opposite ends, said through bore being configured for receipt of said screw therethrough and including a helical internal groove extending over a plurality of turns with a radially inwardly extending helical land formed between adjacent turns, said internal groove having a root diameter and being located generally centrally between said opposite ends and being radially aligned with said external groove of said screw to form a helical raceway;

a plurality of axial load balls disposed in said helical raceway for simultaneous contact with said helical external groove and said helical internal groove;

said ball nut including a plurality of internal cylindrical surfaces extending in axially opposite directions from said internal groove, said internal cylindrical surfaces having a diameter different from said root diameter of said internal groove and extending a predetermined length axially along said external groove of said screw to provide outer surfaces of a plurality of radial load raceways; and a plurality of radial load balls disposed in said radial load raceways for simultaneous contact with said helical external groove and said internal cylindrical surfaces, said radial load balls and said axial load balls having different diameters.

2. The linear ball screw assembly of claim 1 wherein said internal cylindrical surfaces are provided by a plurality of sleeve inserts.

3. The linear ball screw assembly of claim 2 wherein said sleeve inserts are formed of a different type of material from said ball nut.

4. The linear ball screw assembly of claim 3 wherein said material of said ball nut in radial alignment with said sleeve inserts is not hardened.

5. The linear ball screw assembly of claim 2 wherein said internal cylindrical surfaces of said sleeve inserts have a diameter less than said root diameter.

6. The linear ball screw assembly of claim 1 wherein said radial load balls have a smaller diameter than said axial load balls.

7. A linear ball screw assembly, comprising:
a screw having a helical external groove extending continuously over a plurality of turns with a radially outwardly extending, continuous helical land formed between adjacent turns;
a ball nut having a through bore extending between opposite ends, said through bore being configured for receipt of said screw therethrough and including a helical internal groove extending over a plurality of turns with a radially inwardly extending helical land formed between adjacent turns, said internal groove having a root diameter and being located generally centrally between said opposite ends and being radially aligned with said external groove of said screw to form a helical raceway;
a plurality of axial load balls disposed in said helical raceway for simultaneous contact with said helical external groove and said helical internal groove;
a plurality of internal cylindrical surfaces extending in axially opposite directions from said internal groove, said internal cylindrical surfaces having a diameter different from said root diameter of said internal groove and extending a predetermined length axially along said external groove of said screw to provide outer surfaces of a pair of radial load raceways;
a plurality of radial load balls disposed in said radial load raceways for simultaneous contact with said helical external groove and said internal cylindrical surfaces; and
wherein said internal cylindrical surfaces are provided by a plurality of sleeve inserts.

8. The linear ball screw assembly of claim 7 wherein said sleeve inserts are formed of a different type of material from said ball nut.

9. The linear ball screw assembly of claim 8 wherein said material of said ball nut in radial alignment with said sleeve inserts is not hardened.

10. The linear ball screw assembly of claim 7 wherein said internal cylindrical surfaces of said sleeve inserts have a diameter less than said root diameter.

11. The linear ball screw assembly of claim 7 wherein said radial load balls and said axial load balls having different diameters.

12. The linear ball screw assembly of claim 11 wherein said radial load balls have a smaller diameter than said axial load balls.

13. A method of constructing a linear ball screw assembly, comprising:
providing a screw having a helical external groove extending continuously over a plurality of turns with a radially outwardly extending, continuous helical land formed between adjacent turns;
providing a ball nut having a through bore extending between opposite ends with a helical internal groove having a root diameter and extending over a plurality of turns generally centrally between the opposite ends and including a pair of cylindrical bores extending in axially opposite directions from the helical internal groove toward the opposite ends;
disposing a plurality of sleeve inserts having internal cylindrical surfaces having a diameter different from the root diameter of the internal groove in the cylindrical bores of the ball nut;
disposing the screw through the through bore of the ball nut and forming a helical raceway between the helical internal groove of the ball nut and the helical external groove of the screw and a plurality of radial load raceways between the internal cylindrical surfaces of the sleeve inserts and the helical external groove of the screw;
disposing a plurality of balls in the helical raceway and the radial load raceways; and
further including providing the balls as axial load balls in the helical raceway and as radial load balls in the radial load raceways wherein the helical load balls have a different diameter from the radial load balls.

14. The method of claim 13 further including forming the sleeve inserts from a different type of material from the ball nut.

15. The method of claim 13 further including hardening the helical internal groove of the ball nut while avoiding hardening the material of the ball nut that is radially aligned with the sleeve inserts.

16. The method of claim 13 further including providing the ball nut with a recirculating mechanism that circulates the balls through the helical raceway and the radial load raceways.

* * * * *